US009023131B2

(12) United States Patent
Tremblay et al.

(10) Patent No.: US 9,023,131 B2
(45) Date of Patent: May 5, 2015

(54) SYSTEM AND METHOD FOR CONTINUOUSLY PRETREATING A RAW MULTI-PHASE STREAM CAPTURED BY A LANDFILL GAS COLLECTOR

(71) Applicants: Charles Tremblay, Montreal (CA); Alain Roy, Westmount (CA)

(72) Inventors: Charles Tremblay, Montreal (CA); Alain Roy, Westmount (CA)

(73) Assignee: RTJ Technologies Inc., Montreal, Quebec (CA)

( * ) Notice: Subject to any disclaimer, the term of this patent is extended or adjusted under 35 U.S.C. 154(b) by 177 days.

(21) Appl. No.: 13/749,531

(22) Filed: Jan. 24, 2013

(65) Prior Publication Data

US 2013/0199368 A1   Aug. 8, 2013

(30) Foreign Application Priority Data

Feb. 3, 2012  (CA) .................................. 2766355

(51) Int. Cl.
| B01D 19/00 | (2006.01) |
| B01D 45/04 | (2006.01) |
| B01D 45/02 | (2006.01) |

(52) U.S. Cl.
CPC ............ *B01D 19/0073* (2013.01); *B01D 45/04* (2013.01); *B01D 45/02* (2013.01); *B01D 19/0031* (2013.01); *B01D 19/0042* (2013.01); *B01D 19/0063* (2013.01)

(58) Field of Classification Search
CPC .......... B01D 19/0036; B01D 19/0042; B01D 45/02; B01D 45/04; B01D 45/08; B01D 19/0063; B01D 19/0068; B01D 19/0073
USPC ......... 55/431; 95/247, 266; 96/188, 189, 193, 96/197, 204, 206, 220, 408
See application file for complete search history.

(56) References Cited

U.S. PATENT DOCUMENTS

| 3,273,318 A | 9/1966 | Meyer |
| 3,312,045 A | 4/1967 | McCarter |
| 4,479,790 A | 10/1984 | Bocckino et al. |
| 4,681,612 A | 7/1987 | O'Brien et al. |
| 4,727,936 A | 3/1988 | Mioduszewski et al. |
| 4,737,168 A | 4/1988 | Heath |
| 4,890,672 A | 1/1990 | Hall |
| 5,147,185 A | 9/1992 | Niehaus et al. |
| 5,372,621 A * | 12/1994 | Staton et al. .................... 96/408 |
| 5,458,006 A | 10/1995 | Roqueta |

(Continued)

FOREIGN PATENT DOCUMENTS

| EP | 0584762 A2 | 3/1994 |
| FR | 2821414 A1 | 8/2002 |

*Primary Examiner* — Robert Clemente
(74) *Attorney, Agent, or Firm* — Ipaxio S.E.N.C.

(57) ABSTRACT

The system is provided for continuously separating landfill gas in a raw multi-phase stream coming from a landfill gas collector. The system includes an atmospheric tank and an elongated separator vessel mounted substantially upright above the tank bottom. The elongated separator vessel includes a mid-level inlet that is configured and disposed to be in fluid communication with the landfill gas collector pipe, an upper gas outlet located vertically above the mid-level inlet, and a bottom-opened discharge end that is located vertically below the mid-level inlet. A method of pretreating a raw multi-phase stream captured from a landfill site is also disclosed. The proposed concept provides a relatively simple arrangement that can be made sufficiently rugged to perform a pretreatment of the raw multi-phase stream in a continuous manner and with a very minimal intervention from landfill operators under almost any weather and operating conditions.

24 Claims, 2 Drawing Sheets

(56) References Cited

U.S. PATENT DOCUMENTS

| | | |
|---|---|---|
| 5,616,841 A | 4/1997 | Brookshire |
| 5,642,630 A | 7/1997 | Abdelmalek et al. |
| 5,681,360 A | 10/1997 | Siwajek et al. |
| 5,695,641 A | 12/1997 | Cosulich et al. |
| 5,842,357 A | 12/1998 | Siwajek |
| 5,972,061 A | 10/1999 | Nykyforuk |
| 5,984,580 A | 11/1999 | Ham et al. |
| 6,169,962 B1 | 1/2001 | Brookshire et al. |
| 6,453,584 B1 | 9/2002 | Buckner |
| 6,742,962 B2 | 6/2004 | Hater et al. |
| 6,790,367 B2 | 9/2004 | Schmigel et al. |
| 6,999,883 B1 | 2/2006 | Brady et al. |
| 7,025,803 B2 | 4/2006 | Wascheck et al. |
| 7,141,099 B2 * | 11/2006 | Ross et al. ............... 96/155 |
| 7,185,707 B1 | 3/2007 | Graham |
| 7,198,433 B2 | 4/2007 | Augenstein et al. |
| 7,249,607 B2 | 7/2007 | Hansen et al. |
| 7,357,601 B2 | 4/2008 | Howard |
| 7,422,393 B2 | 9/2008 | Schwalbe |
| 7,448,828 B2 | 11/2008 | Augenstein et al. |
| 7,955,419 B2 | 6/2011 | Casella |
| 8,043,506 B2 | 10/2011 | Frankin et al. |
| 8,163,242 B2 | 4/2012 | Elkins |
| 2011/0058901 A1 | 3/2011 | Pelletier |

* cited by examiner

SYSTEM AND METHOD FOR CONTINUOUSLY PRETREATING A RAW MULTI-PHASE STREAM CAPTURED BY A LANDFILL GAS COLLECTOR

CROSS-REFERENCE TO RELATED APPLICATION

The present case claims priority to Canadian Patent Application No. 2,766,355 filed 3 Feb. 2012, the entire contents of which are incorporated herein by reference in their entirety.

TECHNICAL FIELD

The technical field relates generally to systems and methods for continuously pretreating raw multi-phase streams captured by landfill gas collectors in order to separate the landfill gas from the liquid and solids phases of the streams.

BACKGROUND

Landfill sites can be generally defined as areas where waste materials are disposed of over years. In general, land filling operations imply daily covers of granular materials and final covers constructed with impermeable materials such as clay or geo membranes. Municipal solid wastes or the like often include wastes of various natures having a relatively high fraction of organic matter. The organic fraction slowly decays over time, generating what is referred to as the landfill gas. This landfill gas includes mostly methane ($CH_4$) and carbon dioxide ($CO_2$). It also includes other gases in minor proportions. The methane gas is a valuable source of energy but is also a greenhouse gas if released in the atmosphere. Landfill gas capture offers significant environmental and economic benefits when used in a waste-to-energy project. However, landfill gas capture can be very challenging when considering the difficulties in handling the collected materials associated with the landfill gas capture operation. These collected materials form what is referred to hereafter as the raw multi-phase stream. The raw multi-phase stream is a mixture of gases, liquids and solids varying in proportions over time and even from one location to another in the same landfill site. In a landfill site, a raw multi-phase stream can be captured from one landfill gas collector or from a network of landfill gas collectors.

Generally, the raw multi-phase stream tends to plug the landfill gas collector because of the accumulation of solids and liquids. It can also plug the landfill gas collector under cold weather conditions. The raw multi-phase stream thus often requires high maintenance and operation costs. If not managed correctly, it can compromise the overall financial viability of a waste-to-energy project by impacting the quantity and the quality of the collected landfill gas. Still, the technical complexities associated with the handling of a raw multi-phase stream and the extent of the financial investments make smaller landfill sites less attractive for waste-to-energy projects or other greenhouse gas reduction projects.

Accordingly, there is still room for many improvements in this area of technology.

SUMMARY

The proposed concept includes a system and a method that can be made sufficiently rugged to perform a pretreatment of a raw multi-phase stream in a continuous manner and with a very minimal intervention from landfill operators under almost any weather and operating conditions.

In one aspect, there is provided a system for continuously separating landfill gas from a raw multi-phase stream captured with a landfill gas collector, the landfill gas collector including a landfill gas collector pipe, the system including: an atmospheric tank having a tank bottom and a tank leachate level; and an elongated separator vessel mounted substantially upright above the tank bottom, the separator vessel including: a mid-level inlet that is configured and disposed to be in fluid communication with the landfill gas collector pipe; an upper gas outlet located vertically above the mid-level inlet; and a bottom-opened discharge end that is located vertically below the mid-level inlet, the bottom-opened discharge end being located vertically above the tank bottom and below the tank leachate level to maintain a separator vessel leachate level during operation of the system, the separator vessel leachate level being located vertically below the mid-level inlet and above the bottom-opened discharge end.

In another aspect, there is provided a method of pretreating a raw multi-phase stream captured from a landfill site, the method including the simultaneous steps of: receiving the raw multi-phase stream through a mid-level inlet of a substantially-vertical separator vessel; inside a separation chamber of the separator vessel, separating landfill gas from leachate and solids contained in the raw multi-phase stream; removing the landfill gas out of the separator vessel through an upper gas outlet; maintaining a separator vessel leachate level inside the separator vessel vertically below the mid-level inlet and above a bottom-opened discharge end of the separator vessel; receiving the leachate and solids falling by gravity through the bottom-opened discharge end of the separator vessel inside a tank in which a bottom section of the separator vessel is constantly immerged during operation; removing leachate surpluses from the tank; and maintaining the tank at atmospheric pressure.

Further details on these aspects as well as other aspects of the proposed concept will be apparent from the following detailed description and the appended figures.

DETAILED DESCRIPTION

Figure 1:
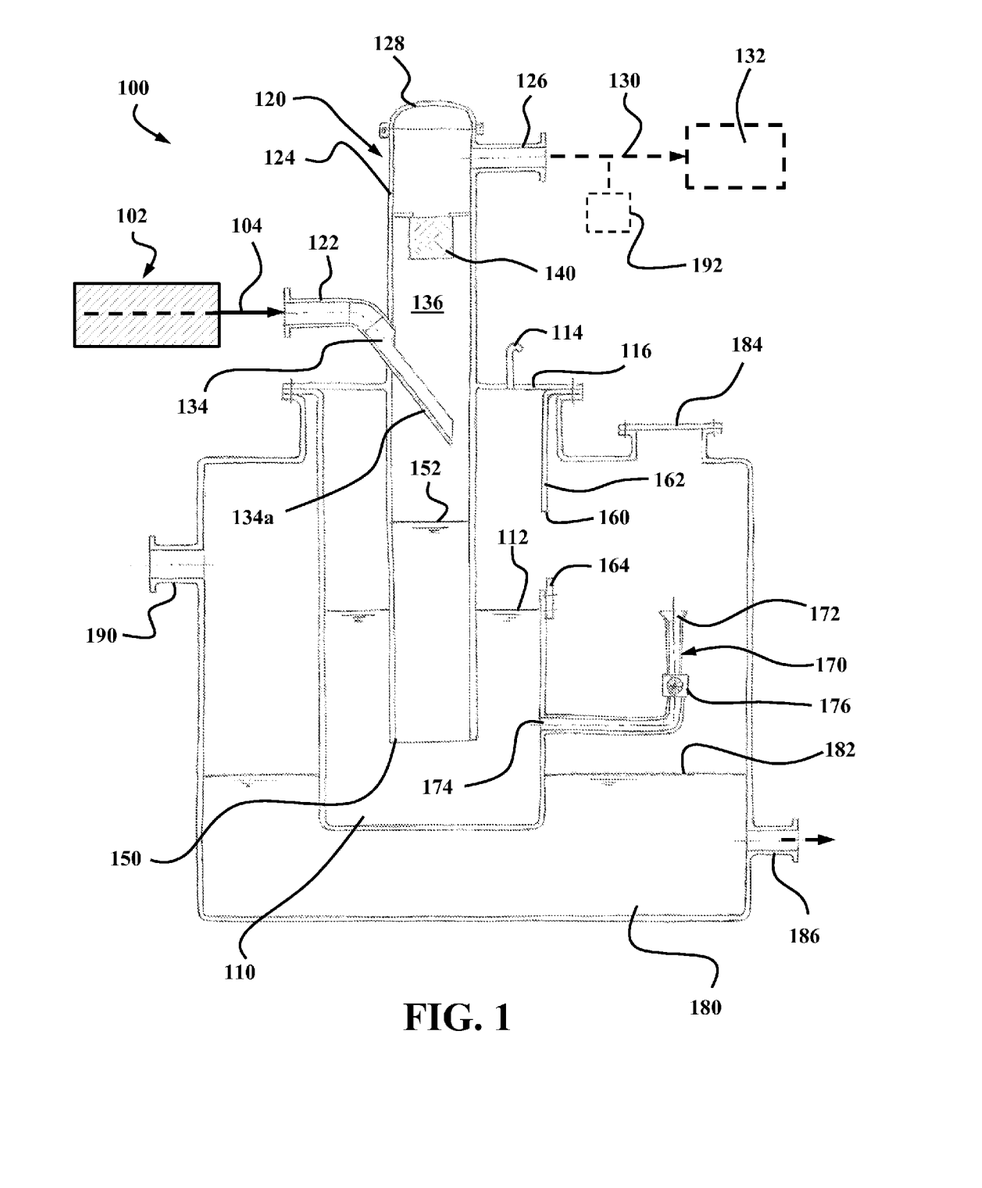
FIG. 1 is a semi-schematic cross-sectional view illustrating an example of a system incorporating the proposed concept.

FIG. 1 is a semi-schematic cross-sectional view illustrating an example of a system 100 incorporating the proposed concept. This system 100 is provided for continuously pretreating a raw multi-phase stream captured by a slopped horizontal landfill gas collector installed in a landfill site so as to separate landfill gas from the rest of the stream. The landfill gas collector is schematically depicted in FIG. 1 at 102. It includes a landfill gas collector pipe 104.

A landfill site would generally include a plurality of systems 100. If desired, these systems 100 can be grouped all together, be provided in spaced-apart clusters or be independent from one another. Each system 100 can also be totally or partially buried underground, or be located above ground in or adjacent to the landfill site.

As aforesaid, the landfill gas collector 102 also captures liquids and solids. A landfill site is generally designed to prevent liquids from leaking underground. Thus, liquids tend to accumulate in the landfill site. Most of these liquids come from rainfalls, melted snow, the waste materials themselves and recycled water added by the landfill site operators to promote the landfill gas generation. Landfill gas collectors installed in the upper portion of a landfill site will tend to capture fewer liquids than the ones located in lower portion of the landfill site. Weather conditions will also have an impact of the overall quantity of liquids in the landfill site.

It should be noted that the expression "raw multi-phase stream" is generally used in a singular form in a non-limitative manner. When the system 100 operates, what is captured in each landfill gas collector 102 generally varies in composition, pressure and quantity over time. Gases and liquids in the raw multi-phase stream can each be in a proportion from 0 to 100% in volume. Solids can generally be in a proportion from 0 to 15% in volume.

Likewise, the expression "landfill gas" is used in a generic manner. This expression is used in a singular form in a non-limitative manner and does not exclude the fact that the composition of the gas phase can be a mixture of two or more gases varying over time.

Still, the expressions "landfill gas collector", "landfill gas collector pipe" and other related expressions refer generally to the conduit or conduits installed in the landfill site to capture the raw multi-phase stream. The word "gas" used in the expressions only reflects the fact that the main goal of the landfill gas collector 102 is to capture the landfill gas. Liquids and solids can also enter the landfill gas collector 102, especially when the landfill gas collector 102 is designed and installed with a drainage slope. A sloped horizontal landfill gas collector generally includes at least one rigid pipe, referred to generically hereafter as the landfill gas collector pipe 104, which is surrounded by crushed stones and/or similar materials within a trench. The landfill gas collector pipe 104 includes a multitude of perforations extending along most of its length where the raw multi-phase stream is collected. Together, the landfill gas collector pipe 104 and the surrounding materials form the landfill gas collector 102.

In use, the landfill gas as well as the liquids and some solids enter the landfill gas collector pipe 104, thereby forming the raw multi-phase stream. The landfill gas collector pipe 104 is configured and disposed so as to drain the liquids and any solids by gravity towards the system 100. Nevertheless, if desired, the system 100 can be used with a landfill gas collector that is not a sloped horizontal landfill gas collector.

In a landfill site, all liquids mix together and form what will now be generically referred to as the "leachate". Leachate thus forms the liquid phase of the raw multi-phase stream. The leachate contains mostly water.

As aforesaid, the raw multi-phase stream can include solids. These solids can be for instance sand particles and/or other small debris coming from the waste materials itself and/or from the daily cover materials. New installations can also collect small solid debris resulting from the construction of the landfill gas collector 102, for instance small plastic pieces and/or small particles made of other solid materials. Some solids can even have a density lower than that of water. Such solids are called hereafter the "floatables".

As shown in FIG. 1, the system 100 includes a tank 110 designed to hold a given quantity of leachate up to what is defined hereafter as the tank leachate level 112. The tank 110 is open to the atmosphere either directly or indirectly through a vent or another suitable arrangement. For this reason, the tank 110 is said to be atmospheric. In FIG. 1, the tank 110 includes a vent 114 at a top wall 116 of the tank 110. Other configurations and arrangements are possible as well, including having the tank 110 being completely open at the top thereof.

The system 100 further includes an elongated separator vessel 120 mounted substantially upright above the bottom of the tank 110. In the illustrated example, the separator vessel 120 partially emerges from the top wall 116 of the tank 110 and extends upwards.

The separator vessel 120 includes an upper section and a bottom section. The upper section is generally located above the tank leachate level 112. The upper section includes a mid-level inlet 122, namely an inlet that is somewhat generally near to the center of the separator vessel 120. Its exact location may vary from one implementation to another. In the illustrated example, the mid-level inlet 122 is a side inlet since it made through a side wall 124 of the separator vessel 120. Other configurations and arrangements are also possible.

The inlet 122 is configured and disposed to be in fluid communication with the end of the landfill gas collector pipe 104. The upper section further includes an upper gas outlet 126 located vertically above the mid-level inlet 122. In the illustrated example, a manhole 128 is provided at the top of the separator vessel 120. This manhole 128 is normally closed and sealed during operation of the system 100.

From the upper gas outlet 126, the landfill gas can be conveyed through an outlet pipe towards another system located either adjacent to the system 100 or away from it. The outlet pipe and the other system are schematically depicted in FIG. 1 at 130 and 132, respectively. The exact nature of the other system 132 will depend on the intended use of the landfill gas. Methane can be useful to produce heat energy, for instance in a boiler or the like. It can also be used in an internal combustion engine to produce electrical power or for another useful purpose. Landfill gas is generally further conditioned downstream the system 100 before being used. In other instances, the other system 132 can be or can include a flare where the landfill gas is burned as to destroy it. The exact use of the landfill gas coming out of the system 100 is not part of the proposed concept and need not to be further discussed herein.

The mid-level inlet 122 can include a main axis defining a bottom-oriented angle with reference to a longitudinal axis of the separator vessel 120. In the illustrated example, the mid-level inlet 122 extends inside the upper section of the separator vessel 120 and includes an inclined separation channel 134. The separation channel 134 includes a U-shaped portion 134a extending obliquely into a separation chamber 136, located inside the separator vessel 120, where the landfill gas separates and flows upwards while the leachate and the solids flow downwards.

In use, the separation channel 134 promotes the gravitational separation of the gas, liquid and solid phases. At the end of the U-shaped portion 134a, the raw multi-phase stream can also gently impinge against the interior of the side wall 124 of the separator vessel 120 to further promote gas separation. It should be noted that the gas phase often tends to separate from the liquid and solids phases within the landfill gas collector pipe 104 when the flow is not too high.

Ideally, the separation should occur with a minimum amount of splashing inside the separation chamber 136 so as to minimize leachate droplets and solid particles in suspension that can be carried upwards with the landfill gas. Leachate droplets and solid particles in suspension are generically referred to hereafter as the airborne substances.

The landfill gas flowing upward will almost always carry over at least some airborne substances. As can be seen in FIG. 1, almost all of these airborne substances can be removed with an inertial separator 140 located at the top of the separator vessel 120 of the illustrated example, immediately upstream the upper gas outlet 126. The inertial separator 140 includes a plurality of spaced-apart baffles over which the airborne substances can adhere and coalesce. The solid particles will generally adhere to the leachate droplets within the inertial separator 140. The leachate and the solids on the baffles eventually fall by gravity towards the bottom of the separator vessel 120. This will decrease the moisture and the solid content in the landfill gas exiting through the upper gas outlet 126. Airborne substances down to 10 μm can generally be captured in the inertial separator 140. Other types of filters or arrangements of filters can also be used as well, either in replacement or in conjunction with the inertial separator 140. While using the inertial separator 140 or another filter can greatly improve the quality of the landfill gas going out through the upper gas outlet 126, one can design the system 100 without one.

To promote the gravitational separation inside the separator vessel 120, its interior diameter can be identical or larger than the interior diameter of the landfill gas collector pipe 104. The diameter ratio between the separator vessel 120 and the landfill gas collector pipe 104 will depend on the flow of the landfill gas to be captured. For instance, the interior diameter of the separator vessel 120 can be from two to four times the interior diameter of the landfill gas collector pipe 104. Typically, the interior diameter of the separator vessel 120 will be between 8 and 24 inches. Other ratios and dimensions are possible as well.

As can be seen in FIG. 1, the bottom section of the separator vessel 120 includes a bottom-opened discharge end 150 located below the tank leachate level 112. The bottom-opened discharge end 150 and the bottom section of the separator vessel 120 are constantly immerged in leachate during the operation of the system 100. It also includes what will be referred to as the separator vessel leachate level 152. This separator vessel leachate level 152 is always located vertically below the mid-level inlet 122 and above the bottom-opened discharge end 150. The separator vessel leachate level 152 is considered to be below the mid-level inlet 122 if it is below about half the opening of the separation channel 134 made through the interior of the side wall 124 of the separator vessel 120.

Once in the tank 110, the solids (if any) will tend to settle at the bottom of the tank 110. The distance between the bottom-opened discharge end 150 and the bottom of the tank 110 is thus calculated so that the expected amount of solids settling at the bottom of the tank 110 will not reach the bottom-opened discharge end 150 in-between maintenance operations.

The tank leachate level 112 can be controlled using different possible arrangements. Since additional leachate will be added to the tank 110 almost continuously when the system 100 operates, the tank leachate level 112 is controlled so as to prevent it from rising above a certain level. The tank leachate level 112, however, will not necessarily be static and can fluctuate. For instance, variation of the gas operating pressure inside the separation chamber 136 can cause the separator vessel leachate level 152 to suddenly rise and draw more leachate inside the bottom section of the separator vessel 120, thereby lowering the tank leachate level 112. Large quantity of leachate can also suddenly flow into the tank 110, creating what is referred to hereafter as a flooding event and raising the tank leachate level 112 to its maximum level.

In the example illustrated in FIG. 1, the system 100 includes an overflow port 160 made through a side wall 162 of the tank 110. This system 100 also includes an adjustable weir gate 164 located adjacent to the overflow port 160. The leachate surpluses can fall by gravity into an overflow reservoir 180 cooperating with the tank 110 when passing through the overflow port 160 and over the weir gate 164. In FIG. 1, the overflow reservoir 180 surrounds the tank 110. The overflow reservoir 180 has an overflow reservoir leachate level 182 that is normally below the tank leachate level 112.

The tank leachate level 112 of the illustrated system 100 is also controlled using an L-shaped side leachate discharge pipe 170. The side leachate discharge pipe 170 includes an upper discharge end 172 located where the tank leachate level 112 stabilizes. Any leachate surplus in the tank 110 will unbalance the hydrostatic level and create a leachate flow from an inlet 174 of the side leachate discharge pipe 170 to its upper discharge end 172, and then into the overflow reservoir 180. The upper discharge end 172 of the discharge pipe 170 is adjustable in height so as to fine tune the system 100. The system 100 is designed so that the side leachate discharge pipe 170 is the location where the leachate surpluses normally flow.

The overflow reservoir 180 includes a manhole 184. This manhole 184 also gives access to the tank 110 through the overflow port 160. The overflow reservoir 180 is at atmospheric pressure.

The system 100 can also be equipped with a leachate flow meter 176 mounted in series on the leachate pipe discharge 170 to provide some information to the operator about leachate volumes extracted from the landfill site over time. Other arrangements and configurations are also possible.

Depending on the solids gravitational separation objectives, the inlet 174 of the discharge pipe 170 can be located lower or higher with reference to the tank bottom in order to control the solids sedimentation processes. The diameter of the discharge pipe 170 can be calculated according to the expected leachate flow to separate and according to the desired monitoring leachate flow.

Other configurations and arrangements are possible for controlling the tank leachate level 112. For instance, one can use a pump controlled by a switch level or the like. One can also simply use an outlet pipe for collecting the leachate surpluses through the overflow port 160 of the tank 110. Many other configurations and arrangements can be devised as well. The use of an overflow reservoir is thus optional.

If should be noted at this stage that before the system 100 is first put into operation, it can be filled with fresh water and/or with leachate coming from the landfill site. This can also be done after a maintenance operation if the tank leachate level 112 is too low. The system 100 can include a built-in filling arrangement, if desired. Alternatively, the fresh water and/or the leachate can be brought into the tank 110 through the inlet 122 or through one of the manholes 128, 184 of the system 100.

The system 100 is designed for the continuous separation of the raw multi-phase stream captured with the landfill gas collector 102 operating under either negative or positive operating gas pressure. While in operation, the separation chamber 136 inside the separator vessel 120 can generally have an operating gas pressure between −25 kPa and +25 kPa with reference to the atmosphere. The system 100 can be designed to operate under all of these conditions with the separator vessel leachate level 152 being always maintained inside the bottom section of the separator vessel 120. This way, the separation chamber 136 will always be sealed from the atmosphere.

When the system 100 is not in operation, a positive gas pressure can build in the separation chamber 136 due to the natural landfill gas generation in the landfill site and entering the landfill gas collector pipe 104. This pressure will push down the separator vessel leachate level 152 until equilibrium is reached between the separator vessel leachate level 152 and the tank leachate level 112. If the positive gas pressure is suddenly unusually high, the landfill gas will simply flow through the bottom-opened discharge end 150 and create bubbles in the leachate contained in the tank 110. The bottom-opened discharge end 150 thus also acts as a relief valve for instance in such a situation. The landfill gas entering the space above the tank 110 can then be evacuated through the vent 114.

Under an induced negative operating gas pressure, the separator vessel leachate level 152 is pulled upward by a suction force coming through the outlet pipe 130 downstream the upper gas outlet 126 of the separator vessel 120. The separator vessel leachate level 152 inside the bottom section will then rise but will stay below the mid-level inlet 122 so as to leave the system 100 operational at all times.

Depending on the implementation, at least a portion of the leachate stored in the overflow reservoir 180 can be pumped or drained through the overflow reservoir outlet 186 for future treatment or be recycled back into the landfill site to add moisture so as to promote landfill gas generation. This can be done using pumps and/or systems and conduits to return the leachate back into the landfill site. Other arrangements and configurations are also possible.

The system 100 can also designed to compensate a flooding event, namely a situation where an unusually large quantity of leachate flows into the separator vessel 120 and the separation chamber 136. In such a situation, the fluid flow capability of the side leachate discharge pipe 170 can be exceeded. The leachate surpluses from the tank 110 will then be evacuated through the overflow port 160, thereby allowing a relatively constant hydrostatic head in the bottom section of the separator vessel 120. The tank leachate level 112 will be controlled using the adjustable weir gate 164 in this situation. The leachate surpluses will be temporary stored in the overflow reservoir 180, leaving the system 100 operational according to the overflow reservoir storage capacity.

A safety system such as an emergency overflow reservoir outlet 190 is provided in the example of FIG. 1 to manage the leachate in the overflow reservoir 180 in case of an extreme flooding event that cannot be compensated by the outlet 186 alone. The outlet 190 will assist in draining the overflow reservoir 180 so the overflow reservoir leachate level 182 does not rise for above the tank leachate level 112. As can be seen in the example depicted in FIG. 1, the bottom of the outlet 190 is approximately at the same height than that of the top edge of the weir gate 164.

As aforesaid, solids will settle at the bottom of the tank 110. These solids can be removed occasionally, either at regular intervals or whenever needed. For instance, removing solids settling at the bottom of the tank 110 can include suction of the solids using a vacuum tube connected to a vacuum truck or a flushing device (not shown) used to empty the tank 110 and, if desired, the overflow reservoir 180, during the maintenance operations. Some implementations may not need such maintenance operations if the solids content is very low and/or tends to be carried away in suspension within the leachate surpluses falling into the overflow reservoir 180.

The system 100 can also include various sensor devices to analyze the composition of the landfill gas coming out of the upper gas outlet 126. Such devices are schematically depicted in FIG. 1 at 192. The sensor devices 192 can be linked to control devices so as to limit and/or vary the negative operating gas pressure according to the gases composition and/or to limit and/or vary the separator vessel leachate level 152.

Figure 2:
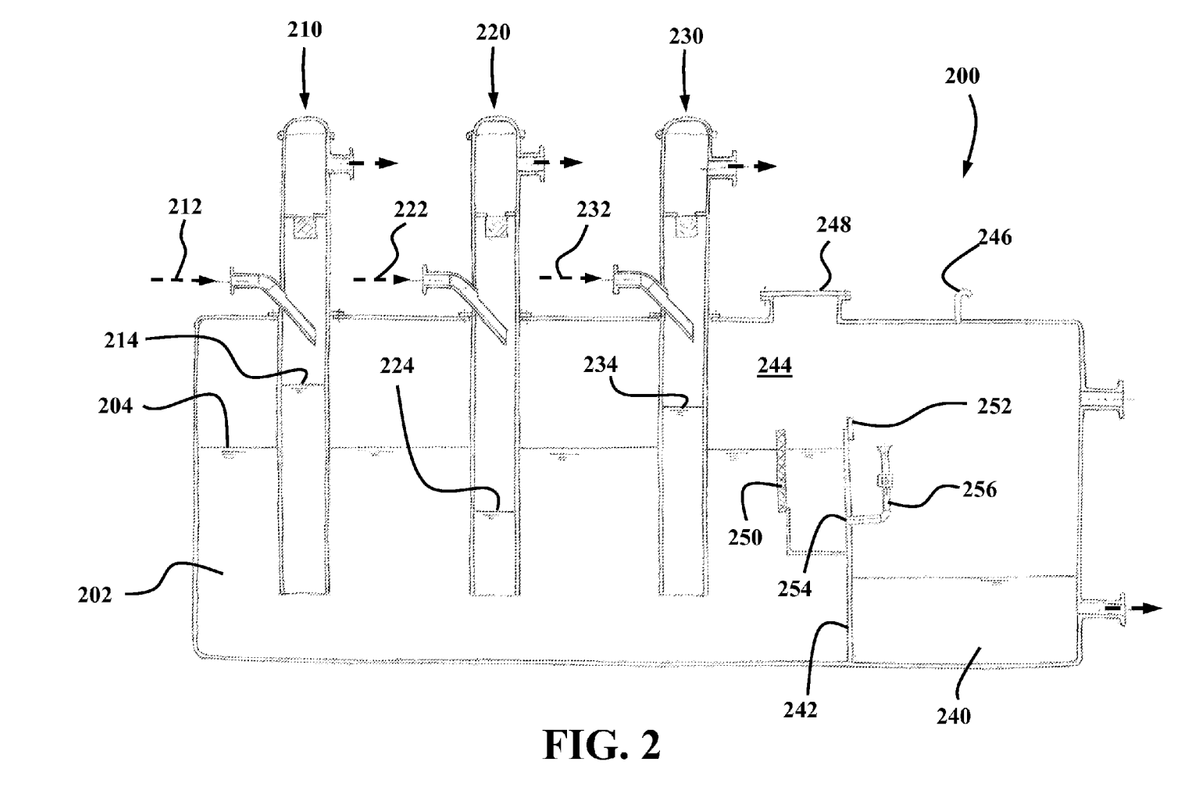
FIG. 2 is a semi-schematic cross-sectional view illustrating another example of a system incorporating the proposed concept.

FIG. 2 is a semi-schematic cross-sectional view illustrating another example of a system 200 incorporating the proposed concept. The system 200 is somewhat similar to the system 100 illustrated in FIG. 1. However, in FIG. 2, the same atmospheric tank 202 is used with three spaced-apart separator vessels 210, 220, 230. Using two or even more than three would also be possible. Each separator vessel 210, 220, 230 is connected to a corresponding landfill gas collector pipe 212, 222, 232. This way, the operating gas pressure inside the separator vessels 210, 220, 230 can be individually adjusted so as to optimize the landfill gas capture and its quality. Nevertheless, using other configurations and arrangements are also possible as well. It would also be possible to provide the system 100 of FIG. 1 with more than one separator vessel.

The tank 202 has a tank leachate level 204.

In the illustrated example, the system 200 also includes an overflow reservoir 240 located adjacent to a side wall 242 of the tank 202. Still, the tank 202 and the overflow reservoir 240 of FIG. 2 are integrated into a single unit. They share a common space 244 that is open to the atmosphere through a vent 246. The system 200 also includes a manhole 248 at the top thereof.

FIG. 2 further shows the system 200 having the separator vessels 210 and 230 under a negative operating gas pressure while the other separator vessel 220 is having a positive gas pressure. As can be seen, the positive gas pressure brings the separator vessel leachate level 224 of that separator vessel 220 below the tank leachate level 204. The separator vessel leachate levels 214, 234 of the other separator vessels 210, 230 are above the tank leachate level 204.

Also in FIG. 2, the system 200 includes a screen filter 250 to prevent the floatables from exiting the tank 202. The screen filter 250 is located immediately upstream the adjustable weir gate 252 and the inlet 254 of the side leachate discharge pipe 256. This feature can also be provided in the system 100 illustrated in FIG. 1. The floatables can be removed from time to time during a maintenance operation, if necessary.

As can be appreciated, the proposed concept provides a relatively simple arrangement that is sufficiently rugged to continuously perform the pretreatment of a raw multi-phase stream having a mixture of gases, liquids and solids in various proportions and regardless if the operating gas pressure is positive or negative. The system and method can be operated under weather conditions at the landfill site that are from −40° C. to +40° C. Even in freezing conditions, the system and method can operate without any external heating devices since landfill gas coming from the landfill gas collector is generally warm enough to supply all the heat needed to prevent freezing. The landfill gas collector pipe is thus prevented from clogging due to freezing if the raw multi-phase stream is flowing continuously. Depending on the raw multi-phase stream composition, the system can even sometimes run for months, if not years, without any major maintenance or interruption.

The present detailed description and the appended figures are meant to be exemplary only. A skilled person will recognize that variants can be made in light of a review of the present disclosure without departing from the proposed concept. For instance, a same separator vessel can include more than one mid-level inlet. A mid-level inlet does not necessary need to be made through the side wall of the separator vessel.

In some implementations, a separator vessel may receive the raw multi-phase stream from a plurality of landfill gas collectors and their corresponding pipes. The raw multi-phase stream from each landfill gas collector would then combine together so as to form a single raw multi-phase stream.

Still, in other implementations, the raw multi-phase stream from one or more landfill gas collectors can be divided into smaller raw multi-phase streams for a separation into a plurality of separator vessels. In such context, the expressions "a raw multi-phase stream" and "the raw multi-phase stream" must be interpreted as also meaning a portion of the original raw multi-phase stream.

The landfill gas collector pipe does not necessary need to be directly in contact with the inlet of the separator vessel. One can use an intermediary component or components, for instance a manifold, to link the landfill gas collector pipe and the inlet of the separator vessel.

The separator vessel or vessels do not necessarily need to be supported by the top wall of the atmospheric tank. For instance, it can be supported by the overflow reservoir (if any) or by another structure located near the atmospheric tank.

Many other variants are also possible as well.

Applicants intended to include all variants that would be known to a person skilled in the art within the elements defined using "means for".

What is claimed is:

1. A system for continuously separating landfill gas in a raw multi-phase stream coming from a landfill as collector, the landfill gas collector including a landfill gas collector pipe, the system including:
    an atmospheric tank having a tank bottom and a tank leachate level;
    an elongated separator vessel mounted substantially upright above the tank bottom, the separator vessel including:
        a mid-level inlet that is configured and disposed to be in fluid communication with the landfill gas collector pipe;
        an upper gas outlet located vertically above the mid-level inlet; and
        a bottom-opened discharge end that is located vertically below the mid-level inlet, the bottom-opened discharge end being located vertically above the tank bottom and below the tank leachate level to maintain a separator vessel leachate level during operation of the system, the separator vessel leachate level being located vertically below the mid-level inlet and above the bottom-opened discharge end; and
    an atmospheric overflow reservoir cooperating with the tank.

2. The system as defined in claim 1, further including means for controlling the tank leachate level.

3. The system as defined in claim 2, wherein the means for controlling the tank leachate level include an overflow port made through a side wall of the tank.

4. The system as defined in claim 3, wherein the means for controlling the tank leachate level further include an adjustable weir gate cooperating with the overflow port.

5. The system as defined in claim 2, wherein the means for controlling the tank leachate level include a side leachate discharge pipe that is in fluid communication with the tank below the tank leachate level.

6. The system as defined in claim 5, wherein the side leachate discharge pipe includes an upper discharge end that is adjustable so as to vary the tank leachate level in height.

7. The system as defined in claim 5, further including means for measuring a quantity of leachate passing through the side leachate discharge pipe.

8. The system as defined in claim 7, wherein the means for measuring the quantity of leachate include a flow meter mounted in series on the side leachate discharge pipe.

9. The system as defined in claim 1, wherein the overflow reservoir surrounds the tank.

10. The system as defined in claim 1, wherein the overflow reservoir is located adjacent to one side of the tank.

11. The system as defined in claim 1, wherein the separator vessel includes a filter provided immediately upstream the upper gas outlet.

12. The system as defined in claim 11, wherein the filter is an inertial separator.

13. The system as defined in claim 1, wherein the gas phase represents between 0 and 100% of the raw multi-phase stream in volume.

14. The system as defined in claim 13, wherein the gas phase includes mostly methane and carbon dioxide.

15. The system as defined in claim 1, wherein during operation of the system, the separator vessel has an operating gas pressure between −25 kPa and +25 kPa with reference to the atmosphere.

16. The system as defined in claim 1, further including at least one additional elongated separator vessel mounted substantially upright above the same atmospheric tank, each separator vessel being spaced apart from one another.

17. The system as defined in claim 16, wherein each separator vessel is connected to one corresponding landfill gas collector, each landfill gas collector being independent from one another.

18. The system as defined in claim 1, further including means for compensating a flooding event.

19. The system as defined in claim 1, further including means for recycling at least some leachate back to a landfill site.

20. The system as defined in claim 1, wherein the separator vessel and the landfill gas collector pipe have a substantially circular interior cross section, the separator vessel having an interior diameter that is identical or larger than that of the landfill gas collector pipe.

21. The system as defined in claim 20, wherein the interior diameter of the separator vessel is at least twice the diameter of the landfill gas collector pipe.

22. The system as defined in claim 20, wherein the interior diameter of the separator vessel is between 8 and 24 inches.

23. A system for continuously separating landfill gas in a raw multi-phase stream coming from a landfill gas collector, the landfill gas collector including a landfill gas collector pipe, the system including:
    an atmospheric tank having a tank bottom and a tank leachate level; and
    an elongated separator vessel mounted substantially upright above the tank bottom, the separator vessel including:
        a mid-level inlet that is configured and disposed to be in fluid communication with the landfill gas collector pipe, the mid-level inlet including a main axis defining a bottom-oriented angle with reference to a longitudinal axis of the separator vessel;
        an upper gas outlet located vertically above the mid-level inlet; and
        a bottom-opened discharge end that is located vertically below the mid-level inlet, the bottom-opened discharge end being located vertically above the tank bottom and below the tank leachate level to maintain a separator vessel leachate level during operation of the system, the separator vessel leachate level being located vertically below the mid-level inlet and above the bottom-opened discharge end.

24. A system for continuously separating landfill gas in a raw multi-phase stream coming from a landfill gas collector, the landfill gas collector including a landfill gas collector pipe, the system including:
    an atmospheric tank having a tank bottom and a tank leachate level; and an elongated separator vessel mounted substantially upright above the tank bottom, the separator vessel being supported by a top wall of the tank, the separator vessel including:
- a mid-level inlet that is configured and disposed to be in fluid communication with the landfill gas collector pipe;
- an upper gas outlet located vertically above the mid-level inlet; and
- a bottom-opened discharge end that is located vertically below the mid-level inlet, the bottom-opened discharge end being located vertically above the tank bottom and below the tank leachate level to maintain a separator vessel leachate level during operation of the system, the separator vessel leachate level being located vertically below the mid-level inlet and above the bottom-opened discharge end.

* * * * *

UNITED STATES PATENT AND TRADEMARK OFFICE
CERTIFICATE OF CORRECTION

| | |
|---|---|
| PATENT NO. | : 9,023,131 B2 |
| APPLICATION NO. | : 13/749531 |
| DATED | : May 5, 2015 |
| INVENTOR(S) | : Charles Tremblay and Alain Roy |

It is certified that error appears in the above-identified patent and that said Letters Patent is hereby corrected as shown below:

IN THE CLAIMS

Claim 1, column 9, line 20
Delete "as" and insert -- gas --

Signed and Sealed this
Eleventh Day of August, 2015

Michelle K. Lee
*Director of the United States Patent and Trademark Office*